(12) United States Patent
Brown et al.

(10) Patent No.: US 11,010,224 B2
(45) Date of Patent: May 18, 2021

(54) SYSTEM AND METHOD OF UTILIZING A WATCHDOG TIMER

(71) Applicant: Dell Products L.P., Round Rock, TX (US)

(72) Inventors: Michael Emery Brown, Austin, TX (US); Wei Liu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 243 days.

(21) Appl. No.: 16/029,271

(22) Filed: Jul. 6, 2018

(65) Prior Publication Data

US 2020/0012552 A1 Jan. 9, 2020

(51) Int. Cl.
*G06F 11/07* (2006.01)
*G06F 1/3203* (2019.01)
*G06F 9/4401* (2018.01)

(52) U.S. Cl.
CPC ........ *G06F 11/0757* (2013.01); *G06F 1/3203* (2013.01); *G06F 9/4408* (2013.01)

(58) Field of Classification Search
CPC .............................. G06F 11/07; G06F 11/0757
USPC .......................................................... 714/55
See application file for complete search history.

(56) References Cited

U.S. PATENT DOCUMENTS

| | | | | |
|---|---|---|---|---|
| 2008/0244302 A1* | 10/2008 | Khatri | ................... | G06F 1/14 713/502 |
| 2011/0302448 A1* | 12/2011 | Okabe | ................ | G03G 15/5004 714/14 |
| 2013/0290778 A1* | 10/2013 | Soderlund | ............. | G06F 9/4406 714/15 |
| 2015/0039925 A1* | 2/2015 | Huang | ...................... | G06F 1/28 713/323 |
| 2015/0268970 A1* | 9/2015 | Mudusuru | ............. | G06F 9/4411 713/1 |
| 2016/0154715 A1* | 6/2016 | Hamdi | ................ | G06F 11/2005 714/4.12 |
| 2016/0154722 A1* | 6/2016 | Petrick | ................ | G06F 11/0784 714/57 |

OTHER PUBLICATIONS

Brown, Len. "ACPI in Linux." *Linux Symposium.* vol. 51. 2005; 20 pages.

(Continued)

*Primary Examiner* — Kamini B Patel
(74) *Attorney, Agent, or Firm* — Baker Botts L.L.P.

(57) ABSTRACT

In one or more embodiments, one or more systems, methods, and/or processes may start a single threaded power on self test process without a periodic handler to communicate with a watchdog timer of an information handling system; may initialize the watchdog timer with an amount of time; may store the amount of time and watchdog timer access interface information via a memory medium of the information handling system; may, after storing the amount of time and the watchdog timer access interface information, boot an operating system; may provide information indicating a location of the amount of time and the watchdog timer access interface information to the operating system; and may periodically reset the watchdog timer via a device driver of the operating system.

20 Claims, 4 Drawing Sheets

(56) References Cited

OTHER PUBLICATIONS

Advanced Configuration and Power Interface Specification, Compaq/Intel/Microsoft/Phoenix/Toshiba, Revision 2.0, Jul. 27, 2000; 481 pages.
Lamberson, Jim. "Single and Multistage Watchdog Timers." *Application Note. Sensoray.* 2012; 7 pages.
Hardware Watchdog Timers Design Specification, Microsoft Corporation 2006; 12 pages.
Advanced Configuration and Power Interface Specification, Compaq/Intel/Microsoft/Phoenix/Toshiba, Revision 5.0, Dec. 6, 2011; 958 pages.
Barr, Michael. "Introduction to watchdog timers." *Embedded systems programming,*<http://www.embedded.com/story/OEG20010920S0064 (Oct. 1, 2001); 5 pages.
Platform Watchdog Profile, DMTF, Document No. DSP1040, Version 1.0.0, Jun. 19, 2009; 35 pages.
Westerberg, Mika. "ACPI Watchdog Table Parsing Support." Intel Corporation, 2016; 3 pages.
Westerberg, Mika. "ACPI Hardware Watchdog (WDAT) driver." Intel Corporation, 2016; 9 pages.

\* cited by examiner

SYSTEM AND METHOD OF UTILIZING A WATCHDOG TIMER

BACKGROUND

Field of the Disclosure

This disclosure relates generally to information handling systems and more particularly to utilizing watchdog timers of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may start a single threaded power on self test process without a periodic handler to communicate with a watchdog timer of an information handling system; may initialize the watchdog timer with an amount of time; may store the amount of time and watchdog timer access interface information via a memory medium of the information handling system; may, after storing the amount of time and the watchdog timer access interface information, boot an operating system; may provide information indicating a location of the amount of time and the watchdog timer access interface information to the operating system; and may periodically reset the watchdog timer via a device driver of the operating system. In one or more embodiments, the operating system may receive the information indicating the location of the amount of time and the watchdog timer access interface information. In one or more embodiments, the operating system may retrieve the amount of time and the watchdog timer access interface information via the memory medium.

In one or more embodiments, the location of the amount of time and the watchdog timer access interface information may include a location of an Advanced Configuration and Power Interface (ACPI) table that includes the amount of time and the watchdog timer access interface information. For example, the operation system may retrieve the amount of time and the watchdog timer access interface information from the ACPI table when the operating system retrieves the amount of time and the watchdog timer access interface information. For instance, the operating system may utilize a management information exchange to access the ACPI table when the operation system retrieves the amount of time and the watchdog timer access interface information from the ACPI table. In one or more embodiments, the operating system may receive the information indicating the location of the amount of time and the watchdog timer access interface information. In one or more embodiments, the operating system may load the device driver. For example, the operating system may load the device driver in response to receiving the information indicating the location of the amount of time and the watchdog timer access interface information.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
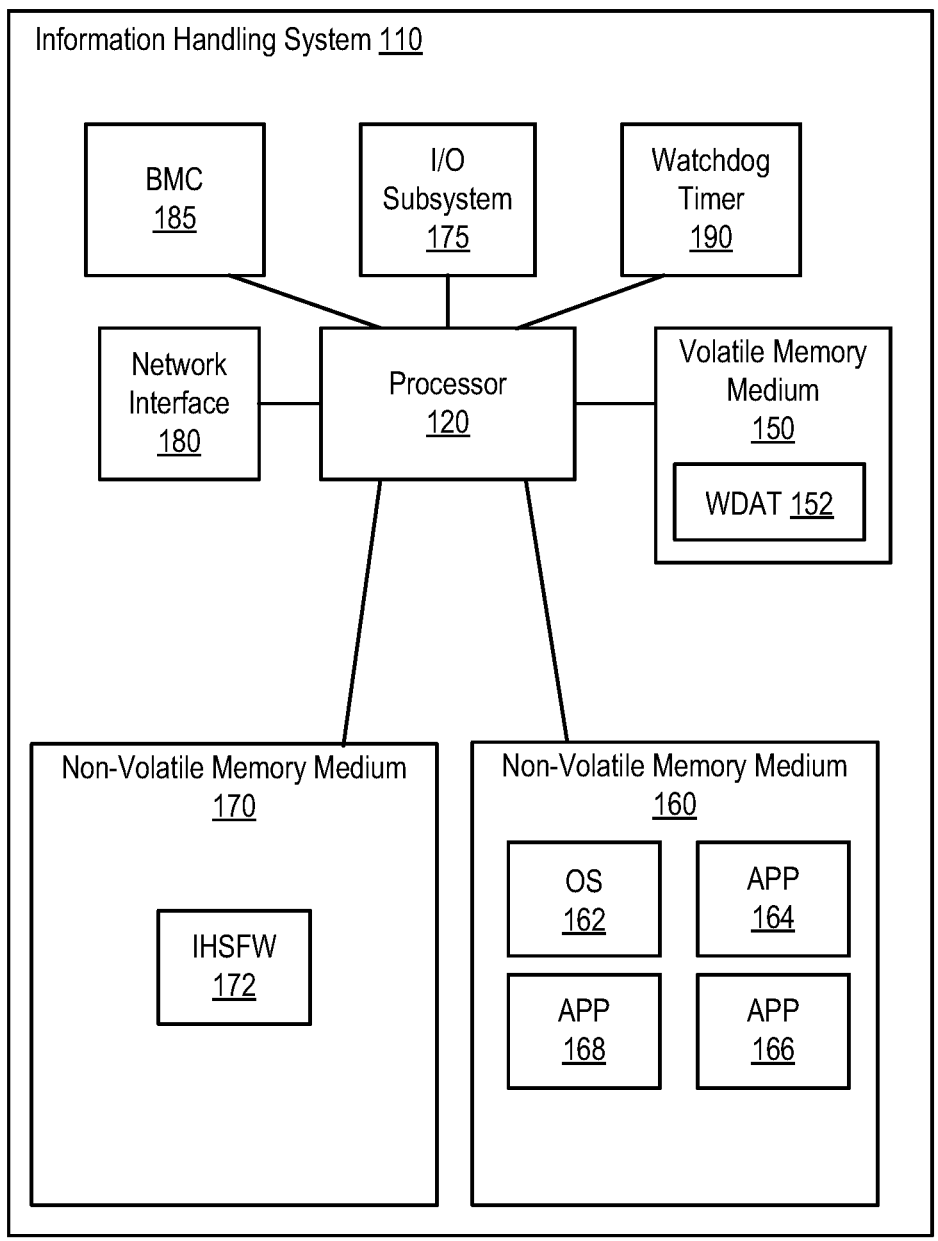
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a processor may execute processor instructions while a watchdog timer determines if a signal from the processor has been received within an amount of time. In one example, the watchdog timer may include a count down timer, which may be utilized in determining if the amount of time has transpired. In another example, the watchdog timer may include a count up timer, which may be utilized in determining if the amount of time has transpired. In one or more embodiments, if the watchdog timer does not receive the signal from the processor within the amount of time, the watchdog timer may perform one or more methods and/or one or more processes. In one example, the watchdog timer may place an information handling system in a safe mode. In a second example, the watchdog timer may reset the processor. In a third example, the watchdog timer may reset an information handling system. For instance, the watchdog timer may reboot the information handling system. In a fourth example, the watchdog timer may raise an interrupt. For instance, the processor may execute an interrupt service routine in response to the interrupt raised by the watchdog timer. In another example, the watchdog timer may initiate a recording of system state information. In one instance, the system state information may be utilized in a fault recovery method and/or a fault recover process. In another instance, the system state information may be utilized a debugging method and/or a debugging process.

In one or more embodiments, an information handling system may perform a power on self test (POST) process. For example, the POST process may be performed subsequently to receiving power to the information handling system. In one or more embodiments, the POST process may include verifying processor registers, verifying an integrity of information handling system firmware, verifying a timer, verifying a direct memory access system, determining a size of a memory medium, verifying a memory medium, identifying an interface for booting (e.g., a memory medium interface, a network interface, etc.), selecting an interface for booting (e.g., a memory medium interface, a network interface, etc.), and/or passing control to the information handling system firmware, among others. In one or more embodiments, the POST process may be a single threaded process. For example, the POST process may not include a process that may periodically communicate with a watchdog timer. For instance, the POST process may not include a process that may periodically ping a watchdog timer. In one or more embodiments, pinging the watchdog timer may be referred to as petting the watchdog and/or feeding the watchdog, among others.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a boot management controller (BMC) 185, and a watchdog timer 190. As illustrated, volatile memory medium 150, non-volatile memory media 160 and 170, I/O subsystem 175, network interface 180, BMC 185, and watchdog timer 190 may be communicatively coupled to processor 120. Although not specifically illustrated, processor 120 may include watchdog timer 190, according to one or more embodiments.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150. In one or more embodiments, IHSFW 172 may create and/or publish a watchdog action table (WDAT) 152. For example, WDAT 152 may be stored via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be or include one or more of a FPGA and an ASIC, among others, configured, coded, and/or encoded with instructions in accordance with one or more of systems, flowcharts, methods, and/or processes described herein.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include an implementation of one or more portions of a Windows Management Interface (WMI) for ACPI (available from Microsoft Corporation). In another instance, the management information exchange may be or include an implementation of one or more portions of a Common Information Model (CIM) (available via the Distributed Management Task Force). In one or more embodiments, the management information exchange may include a combination of an implementation of one or more portions of the WMI and an implementation of one or more portions of the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 2:
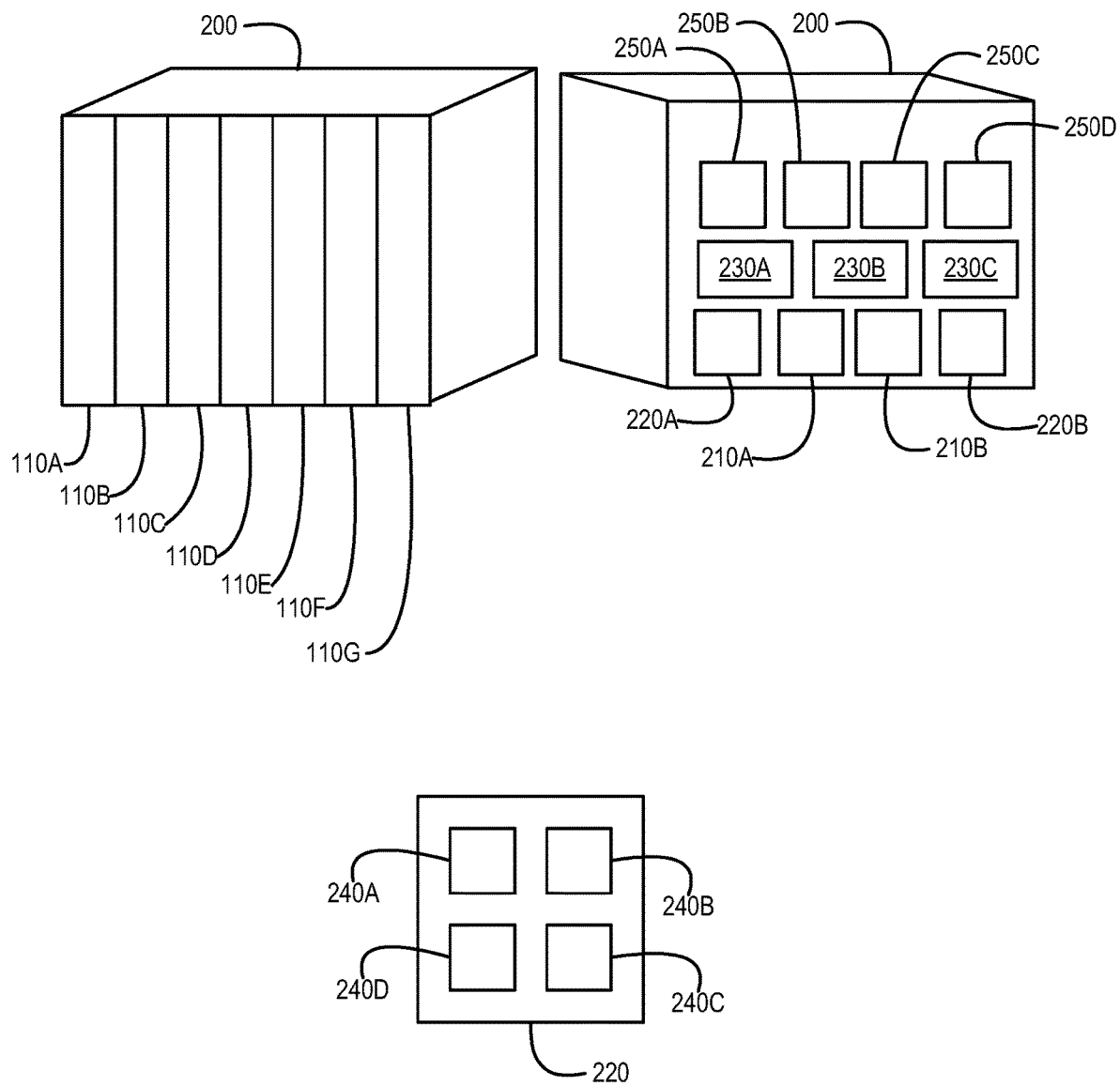
FIG. 2 illustrates an example of an information handling system chassis, according to one or more embodiments.

Turning now to FIG. 2, an example of an information handling system chassis is illustrated, according to one or more embodiments. As shown, an information handling system chassis 200 may include and/or may be configured to include multiple information handling systems (IHSs). For example, chassis 200 may and/or may be configured to include IHSs 110A-110G. For instance, each of one or more of IHSs 110A-110G may include one or more structures and/or one or more functionalities as those described with reference to IHS 110. In one or more embodiments, chassis 200 may be configured to house one or more of IHSs 110A-110G. For example, one or more of IHSs 110A-110G may be removable. For instance, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one example, an enclosure controller (EC) 210 may be or include a chassis management services module (MSM). In another example, an EC 210 may be or include a chassis management controller (CMC). In one or more embodiments, chassis 200 may include one or more power supply nodes (PSNs). As shown, chassis 200 may include PSNs 220A and 220B. In one or more embodiments, a power supply node (PSN) 220 may include one or more power supply units (PSUs) 240. For example, a PSN 220 may include multiple power PSUs 240A-240D. For instance, if one of the multiple PSUs is associated with an issue, PSN 220 may continue to provide power to chassis 200 via one or more other PSUs.

In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated, chassis 200 may include fans 230A-230C. In one or more embodiments, an EC 210 may monitor one or more fans 230, one or more temperatures of one or more portions of chassis 200, one or more PSUs 240, and/or one or more PSNs 220, among others. In one or more embodiments, EC 210 may control one or more portions and/or one or more components of chassis 200. In one or more embodiments, EC 210 may include one or more structures and/or one or more functionalities as those described with reference to IHS 110. In one or more embodiments, EC 210 may be configured, coded, and/or encoded with instructions in accordance with one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one or more embodiments, one or more of non-volatile memory media 250A-250D may provide storage for one or more of IHSs 110A-110G.

In one or more embodiments, one or more of IHSs 110A-110G may be or include respective one or more blade servers. For example, a blade server may utilize a blade chassis. For instance, chassis 200 may be or include a blade chassis. In one or more embodiments, the terms "blade" and "blade server" may mean "server node" or "sled", among others.

In one or more embodiments, EC 210 may be or include a hot pluggable module. For example, EC 210 may receive power from chassis 200. In one or more embodiments, EC 210 may provide a user interface. For example, the user interface may be utilized in performing one or more configuration processes, one or more monitoring processes, one or more power up processes (e.g., one or more power up processes of one or more of IHSs 110A-110G), one or more power down processes (e.g., one or more power down processes of one or more of IHSs 110A-110G), and/or one or more alerting processes, among others. In one or more embodiments, the user interface may include a web browser based interface. For example, one or more of IHSs 110A-110G, among others, may be managed via the web browser based interface. In one or more embodiments, EC 210 may communicate with and/or integrate with a BMC 185 of an IHS 110. For example, a user may perform one or more BMC processes via the user interface of EC 210. For instance, the one or more BMC processes may include one or more of an update process, a configuration change process, a remote console session process, a back up process, configuration replication process, a save IHSFW process, and/or an apply IHSFW profile process, among others.

Figure 3:
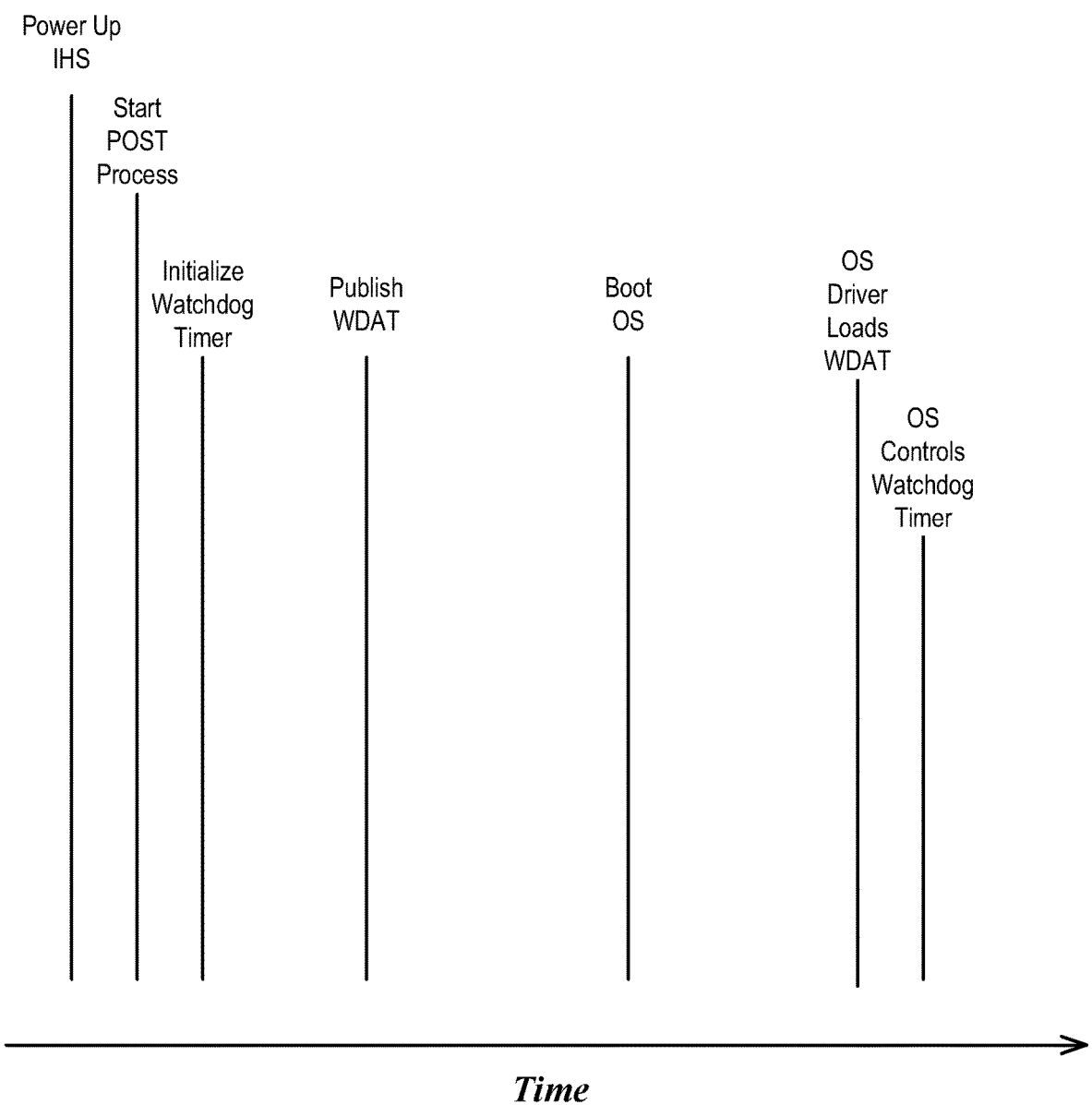
FIG. 3 illustrates an example of a timing chart, according to one or more embodiments.

Turning now to FIG. 3, an example of a timing chart is illustrated, according to one or more embodiments. As shown, an information handling system may be powered up. In one example, the information handling system may be or include EC 210. In another example, the information handling system may be or include IHS 110. As illustrated, a POST process may be started. In one or more embodiments, IHSFW 172 may include the POST process. In one or more embodiments, the POST process may initialize a watchdog timer. As shown, a watchdog timer may be initialized after starting the POST process. In one or more embodiments, the POST process may publish a watchdog action table (WDAT). For example, the WDAT may be or include a resource table. For instance, the WDAT may be or include an ACPI table. In one or more embodiments, IHSFW 172 may include and/or provide one or more tables that include information associated with one or more elements of the information handling system, boot services, and/or runtime services that may be available to OS 162 and/or to a loader of OS 162.

In one or more embodiments, the WDAT may include information that may be utilized in controlling and/or communicating with the watchdog timer. In one example, the information may include an indication that the watchdog timer is enabled. In a second example, the information may include data associated with stopping the watchdog timer. In a third example, the information may include data associated with starting the watchdog timer. In a fourth example, the information may include data associated with changing an interval time of the watchdog timer. In another example, the information may include data associated with pinging the watchdog timer. In one or more embodiments, IHSFW 172 may provide a parameter to OS 162 that indicates a location of the WDAT. For example, the location of the WDAT may be or include an address of a memory medium. In one or more embodiments, OS 162 may determine that the WDAT exists. For example, OS 162 may load and/or initiate a device driver that may ping the watchdog timer. For instance, OS 162 may load and/or initiate a device driver that may ping the watchdog timer in response to determining that the WDAT exists.

In one or more embodiments, a background process may be utilized to ping the watchdog timer. In one example, the background process may utilize the device driver to ping the watchdog timer. In another example, the background process may be or include a primary process of OS 162. For instance, if the background process malfunctions or terminates, the information handling system may reboot when the watchdog resets the information handling system. In one or more embodiments, a background process may be or include a daemon on a Unix or Unix-like OS. In one or more embodiments, a background process may be or include a Windows service on a Microsoft Windows OS.

Figure 4:
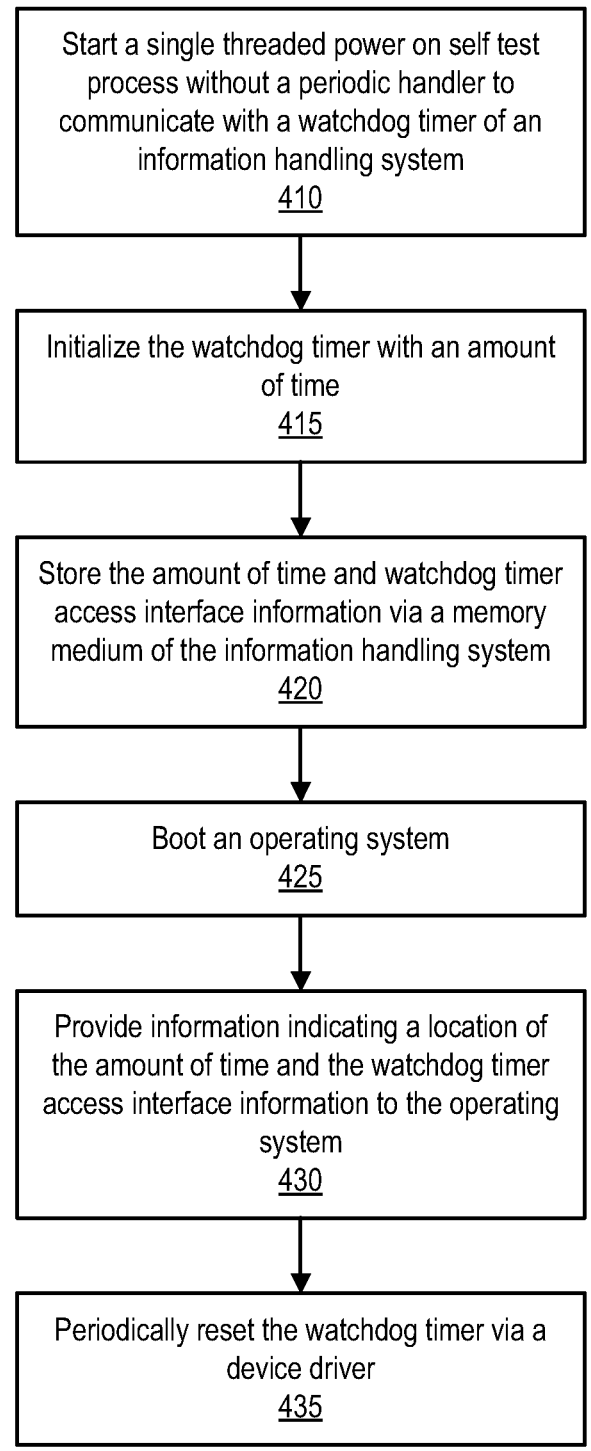
FIG. 4 illustrates an example of a method of operating an information handling system, according to one or more embodiments.

Turning now to FIG. 4, an example of a method of operating an information handling system is illustrated, according to one or more embodiments. At 410, a single threaded power on self test process without a periodic handler to communicate with a watchdog timer of an information handling system may be started. In one example, the information handling system may be or include IHS 110. In another example, the information handling system may be or include EC 210. At 415, the watchdog timer may be initialized with an amount of time. For example, the power on self test may initialize the watchdog timer may be initialized with an amount of time.

At 420, the amount of time and watchdog timer access interface information may be stored via a memory medium of the information handling system. In one or more embodiments, storing the amount of time and the watchdog timer access interface information may include storing the amount of time and the watchdog timer access interface information via an ACPI table. For example, the ACPI table may be or include WDAT 152. At 425, an operating system may be booted. For example, OS 162 may be booted. In one or more embodiments, the operating system may be booted after storing the amount of time and the watchdog timer access interface information.

At 430, information indicating a location of the amount of time and the watchdog timer access interface information may be provided to the operating system. For example, information indicating a location of the amount of time and the watchdog timer access interface information may be provided to OS 162. In one or more embodiments, IHSFW 172 may provide the information indicating the location of the amount of time and the watchdog timer access interface information to OS 162. For example, OS 162 may receive the information indicating the location of the amount of time and the watchdog timer access interface information. For instance, OS 162 may receive an address of WDAT 152.

In one or more embodiments, OS 162 may retrieve the amount of time and the watchdog timer access interface information via the memory medium. For example, OS 162 may access the amount of time and the watchdog timer access interface information. In one instance, OS 162 may access the amount of time and the watchdog timer access interface information via WDAT 152. In another instance, OS 162 may retrieve the amount of time and the watchdog timer access interface information via WDAT 152. In one or more embodiments, OS 162 may utilize a management information exchange to access WDAT 152. For example, OS 162 may utilize one or more of WMI and CIM, among others, to access WDAT 152 and/or retrieve information from WDAT 152.

In one or more embodiments, a device driver of OS 162 may access WDAT 152. For example, the device driver may utilize a management information exchange to access WDAT 152. For instance, the device driver may utilize one or more of WMI and CIM, among others, to access WDAT 152 and/or retrieve information from WDAT 152. In one or more embodiments, the operating system may load the device driver. For example, OS 162 may load the device driver. For instance, the device driver may be or include a kernel loadable module. In one or more embodiments, the operating system may load the device driver in response to receiving the information indicating the location of the amount of time and the watchdog timer access interface information.

At 435, the watchdog timer may be periodically reset via the device driver. For example, a background process may periodically reset the watchdog timer via the device driver. In one or more embodiments, periodically resetting the watchdog timer via the device driver may include periodically pinging the watchdog timer via the device driver.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores instructions executable by the at least one processor, which when executed by the at least one processor, cause the information handling system to:
   in response to receiving power to the information handling system, start a single threaded power on self test (POST) process, wherein the POST process is configured to:
      initialize a watchdog timer with an amount of time; and
      publish a watchdog action table (WDAT) comprising one or more tables of information;
   store the amount of time and watchdog timer access interface information via the memory medium;
   after storing the amount of time and the watchdog timer access interface information, boot the operating system; and
   after booting the operating system, provide one or more of information indicating a location of the amount of time and the watchdog timer access interface information and the WDAT to the operating system.

2. The information handling system of claim 1, wherein, to store the amount of time and the watchdog timer access interface information, the instructions cause the information handling system to store the amount of time and the watchdog timer access interface information via an Advanced Configuration and Power Interface (ACPI) table.

3. The information handling system of claim 1,
   wherein the operating system is configured to retrieve the information indicating the location of the amount of time and the watchdog timer access interface information; and
   wherein the operating system is configured to load a device driver in response to retrieving the information indicating the location of the amount of time and the watchdog timer access interface information; and
   the operating system is configurable to reset the watchdog timer via the device driver.

4. The information handling system of claim 3,
   wherein the location of the amount of time and the watchdog timer access interface information includes a location of an Advanced Configuration and Power Interface (ACPI) table that includes the amount of time and the watchdog timer access interface information; and
   wherein, when the operating system retrieves the amount of time and the watchdog timer access interface information, the operation system retrieves the amount of time and the watchdog timer access interface information from the ACPI table.

5. The information handling system of claim 4, wherein, when the operation system retrieves the amount of time and the watchdog timer access interface information from the ACPI table, the operating system utilizes a management information exchange to access the ACPI table.

6. The information handling system of claim 3, wherein:
   the operating system receives the information indicating the location of the amount of time and the watchdog timer access interface information; and
   in response to receiving the information indicating the location of the amount of time and the watchdog timer access interface information, the operating system loads the device driver.

7. The information handling system of claim 1, wherein the information handling system is an enclosure controller of a chassis that is configured to house a plurality of information handling systems.

8. A method, comprising:
   in response to receiving power, an information handling system starting a single threaded power on self test (POST) process, the POST process configured to perform:
      initializing a watchdog timer with an amount of time; and
      publishing a watchdog action table (WDAT) comprising one or more tables of information;
   storing the amount of time and watchdog timer access interface information via a memory medium of the information handling system;
   after the storing the amount of time and the watchdog timer access interface information, booting an operating system; and
   after booting the operating system, providing one or more of information indicating a location of the amount of time and the watchdog timer access interface information and the WDAT to the operating system.

9. The method of claim 8, wherein the processor storing the amount of time and the watchdog timer access interface information includes storing the amount of time and the watchdog timer access interface information via an Advanced Configuration and Power Interface (ACPI) table.

10. The method of claim 8, further comprising:
the operating system retrieving one or more of the information indicating the location of the amount of time and the watchdog timer access interface information and the WDAT; and
the operating system loading a device driver in response to retrieving one or more of the information indicating the location of the amount of time and the watchdog timer access interface information and the WDAT; and
the operating system resetting the watchdog timer via the device driver.

11. The method of claim 10,
wherein the location of the amount of time and the watchdog timer access interface information includes a location of an Advanced Configuration and Power Interface (ACPI) table that includes the amount of time and the watchdog timer access interface information; and
wherein the operating system retrieving the amount of time and the watchdog timer access interface information includes the operation system retrieving the amount of time and the watchdog timer access interface information from the ACPI table.

12. The method of claim 11, wherein the operation system retrieving the amount of time and the watchdog timer access interface information from the ACPI table includes the operating system utilizing a management information exchange to access the ACPI table.

13. The method of claim 10, further comprising:
the operating system receiving the information indicating the location of the amount of time and the watchdog timer access interface information; and
in response to the operating system receiving the information indicating the location of the amount of time and the watchdog timer access interface information, the operating system loading the device driver.

14. The method of claim 8, wherein the information handling system is an enclosure controller of a chassis that is configured to house a plurality of information handling systems.

15. A computer-readable non-transitory memory medium that includes instructions that, when executed by at least one processor of an information handling system, cause the information handling system to:
in response to receiving power by the information handling system, start a single threaded power on self test (POST) process, wherein the POST process is configured to:
initialize a watchdog timer with an amount of time; and
publish a watchdog action table (WDAT) comprising one or more tables of information;
store the amount of time and watchdog timer access interface information via the memory medium;
after storing the amount of time and the watchdog timer access interface information, boot an operating system; and
after booting the operating system, provide one or more of information indicating a location of the amount of time and the watchdog timer access interface information and the WDAT to the operating system.

16. The computer-readable non-transitory memory medium of claim 15, wherein, to store the amount of time and the watchdog timer access interface information, the instructions further cause the information handling system to store the amount of time and the watchdog timer access interface information via an Advanced Configuration and Power Interface (ACPI) table.

17. The computer-readable non-transitory memory medium of claim 15, wherein;
the operating system is configured to retrieve the information indicating the location of the amount of time and the watchdog timer access interface information; and
the operating system loads a device driver in response to retrieving the information indicating the location of the amount of time and the watchdog timer access interface information; and
the operating system resets the watchdog timer via the device driver.

18. The computer-readable non-transitory memory medium of claim 17, wherein the location of the amount of time and the watchdog timer access interface information includes a location of an Advanced Configuration and Power Interface (ACPI) table that includes the amount of time and the watchdog timer access interface information; and
wherein, when the operating system retrieves the amount of time and the watchdog timer access interface information, the operation system retrieves the amount of time and the watchdog timer access interface information from the ACPI table.

19. The computer-readable non-transitory memory medium of claim 18, wherein, when the operation system retrieves the amount of time and the watchdog timer access interface information from the ACPI table, the operating system utilizes a management information exchange to access the ACPI table.

20. The computer-readable non-transitory memory medium of claim 15, wherein the information handling system is an enclosure controller of a chassis that is configured to house a plurality of information handling systems.

* * * * *